United States Patent [19]

Johansson et al.

[11] 4,377,183
[45] Mar. 22, 1983

[54] ADJUSTABLE FLOW RESTRICTING VALVE

[75] Inventors: Folke L. Johansson, Malsryd; Bengt F. S. Svenning, Fritsla, both of Sweden

[73] Assignee: Atlas Copco Aktiebolag, Nacka, Sweden

[21] Appl. No.: 132,410

[22] Filed: Mar. 21, 1980

Related U.S. Application Data

[63] Continuation of Ser. No. 886,753, Mar. 15, 1978, abandoned, which is a continuation-in-part of Ser. No. 723,069, Sep. 14, 1976, abandoned.

[30] Foreign Application Priority Data

Sep. 19, 1975 [SE] Sweden .................... 7510498

[51] Int. Cl.³ .............. F16K 5/10; F16K 31/53
[52] U.S. Cl. ................... 137/606; 137/884; 137/886; 137/887; 251/209; 251/249.5; 251/310; 91/443; 91/530
[58] Field of Search ......... 251/207, 209, 310, 249.5, 251/250; 137/606, 886, 887, 884; 91/443, 444, 530

[56] References Cited

U.S. PATENT DOCUMENTS

| | | | |
|---|---|---|---|
| 1,931,048 | 10/1933 | Wiener | 251/310 X |
| 2,307,171 | 1/1943 | Tutton | 251/249.5 |
| 2,384,912 | 9/1945 | Helin | 251/249.5 X |
| 2,415,285 | 2/1947 | Hurst | 251/249.5 |
| 2,564,223 | 8/1951 | Long | 251/209 |
| 3,209,784 | 10/1965 | Schwartz | 251/249.5 |
| 3,529,621 | 9/1970 | Christianson | 251/310 X |
| 3,645,493 | 2/1972 | Manoogian et al. | 251/310 |
| 3,801,233 | 4/1974 | Simpson | 251/249.5 |

FOREIGN PATENT DOCUMENTS

| | | | |
|---|---|---|---|
| 30712 | 11/1906 | Austria | 251/249.5 |
| 1016994 | 10/1957 | Fed. Rep. of Germany | 137/887 |
| 1142046 | 3/1957 | France . | |
| 976585 | 11/1964 | United Kingdom | 251/310 |

*Primary Examiner*—Arnold Rosenthal
*Attorney, Agent, or Firm*—Frishauf, Holtz, Goodman & Woodward

[57] ABSTRACT

An adjustable flow restricting valve for speed control of a pneumatic motor, comprising a tube shaped valve body which is rotatably supported in a boring and which is provided with a recess for uncovering fully or partly an outlet opening in the boring. The restricting valve is associated with a control valve for operation of a pneumatic motor. The tube shaped valve body is rotatable by means of a maneuver screw which extends transversely relative to the valve body and which forms a worm gear with the latter. The high gear ratio of the worm gear enables a precise setting of the valve body. In a multiple arrangement of control valves, the tubular valve body of one flow restricting valve forms part of the exhaust passage from one or more flow restricting valves, located upstream thereof.

16 Claims, 4 Drawing Figures

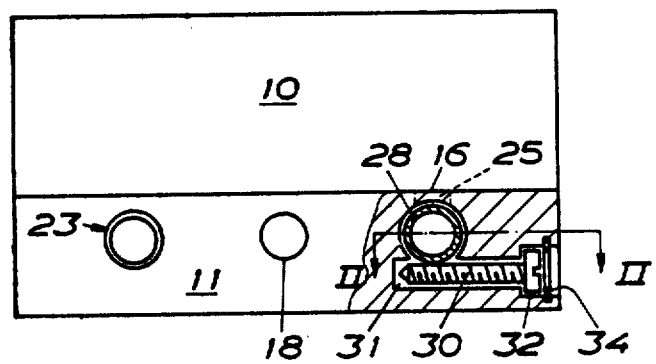
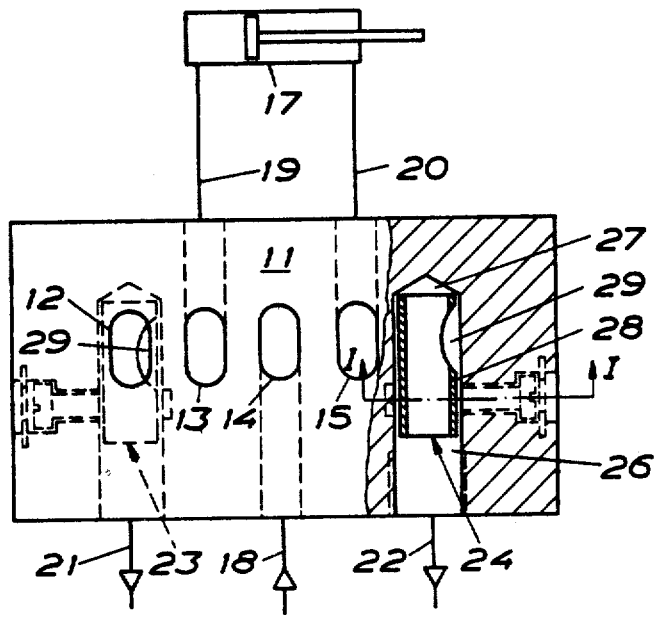

ADJUSTABLE FLOW RESTRICTING VALVE

This is a continuation of application Ser. No. 886,753 filed Mar. 15, 1978 now abandoned, which is a continuation-in-part of Ser. No. 723,069 filed Sept. 14, 1976 now abandoned.

This invention relates to an adjustable flow restricting valve intended for, for instance, speed control of pneumatic motors. In particular, the invention concerns an adjustable fow restricting valve for controlling the outlet flow of a motor and thereby obtaining a desired velocity of the motor.

The object of the present invention is to make a novel restricting valve which is cheap to manufacture, simple as regards construction and by which it is possible to obtain an accurate setting of the motor speed. This is accomplished by a valve according to the invention as it is defined in the claims.

An embodiment of the invention is hereinbelow described in detail with reference to the accompanying drawing on which

BRIEF DESCRIPTION OF THE DRAWINGS

FIG. 1 shows a side-elevation of a standard type control valve including a subplate in which there is mounted two restricting valves according to the invention.

FIG. 1 is partly broken along line I—I in FIG. 2.

FIG. 2 shows a top view of the control valve subplate in FIG. 1. FIG. 2 is partly broken along line II—II in FIG. 1.

DETAILED DESCRIPTION

Figure 3:
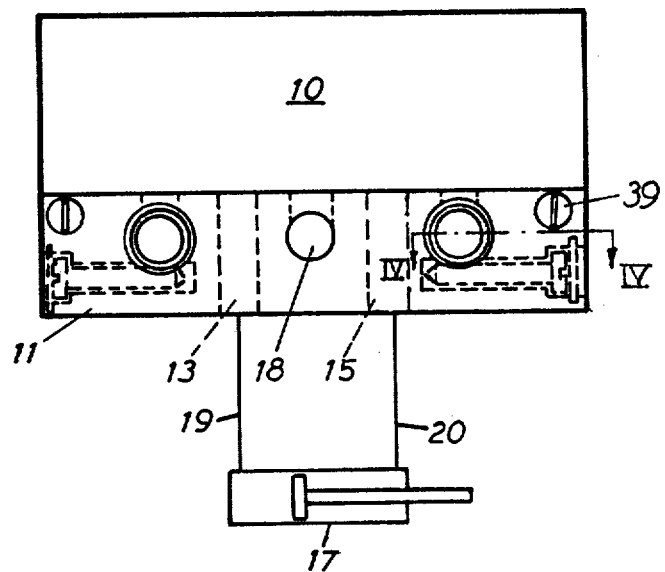
FIG. 3 shows a side-elevation of a valve arrangement similar to that in FIGS. 1 and 2 but somewhat modified to enable multiple arrangement.

In the Figures, 10 designates a standard type control valve and 11 designates a subplate associated with the valve. (As the control valve 10 does not constitute a part of the invention, it is not described in detail.) All of the conduit connections of the control valve 10 are located on the subplate 11. Communication between the valve and the subplate is established through the openings 12 to 16. When used in connection with a pneumatic motor 17, the opening 14 is connected to a pressure air source through the conduit 18. The openings 13 and 15 are connected to the motor 17 via service conduits 19 and 20, while the openings 12 and 16 communicate with the air discharge conduits 21 and 22 via air outlet passages in the subplate.

In one of its positions the control valve 10 interconnects the openings 14 and 15 as well as the openings 13 and 12, whereby the part of the motor 17 that is connected to the opening 15 is pressurized, whereas the other part of the motor 17 is drained through conduit 21.

In its opposite position the control valve 10 interconnects the openings 14 and 13 as well as the openings 15 and 16, whereby the motor 17 is powered in its opposite direction.

In order to control the motor speed the subplate 11 is provided with two restricting valves 23, 24 designed in accordance with the invention. These valves are located in the outlet passages of the subplate and are arranged to restrict the outlet flow of the motor 17.

Above there is described an application for a restricting valve according to the invention. Below there is described in detail a restricting valve designed in accordance with the invention.

Each of the restricting valves 24 comprise a housing, in this case constituted by the subplate 11, which housing is provided with an inlet passage 25 and an outlet passage 26. The inlet passage 25 extends between the opening 16 and a boring 27. In the boring 27 there is rotatably supported a tube shaped valve body 28.

The valve body 28 is provided with a recess in the form of an opening 29 which, in response to its angular position, is arranged to fully or partly uncover the inlet passage 25 and connect the latter to the outlet passage 26.

For obtaining angular displacement of the valve body 28 and thereby a proper setting of the restrictor there is provided a maneuver screw 30. The maneuver screw 30 is rotatably supported in a boring 31 which extends transversely relative to the rotation axis of the valve body 28. The maneuver screw 30 is operable from outside the housing 11.

In the shown embodiment of the restricting valve the maneuver screw 30 is constituted by a standard type self tapping screw, the head of which is received in a wider portion 32 of the boring 31. The wider portion 32 of the boring 31 is provided with an annular groove in which is secured a lock ring 34. The purpose of the latter is to prevent axial movement of the maneuver screw 30.

The maneuver screw 30 engages the outer surface of the valve body 28 to form a worm gear by which the valve body 28 is rotatable. The valve body 28 may be preformed with longitudinally extending ribs (not shown) for cooperation with the thread of the maneuver screw 30. However, according to a preferred embodiment of the invention the valve body 28 is made of plastic in which longitudinal slots are cut by the selftapping maneuver screw.

The worm gear which is formed by the maneuver screw 30 and the valve body 28 has a high gear ratio which makes it possible to obtain an accurate setting of the valve body 28.

Figure 4:
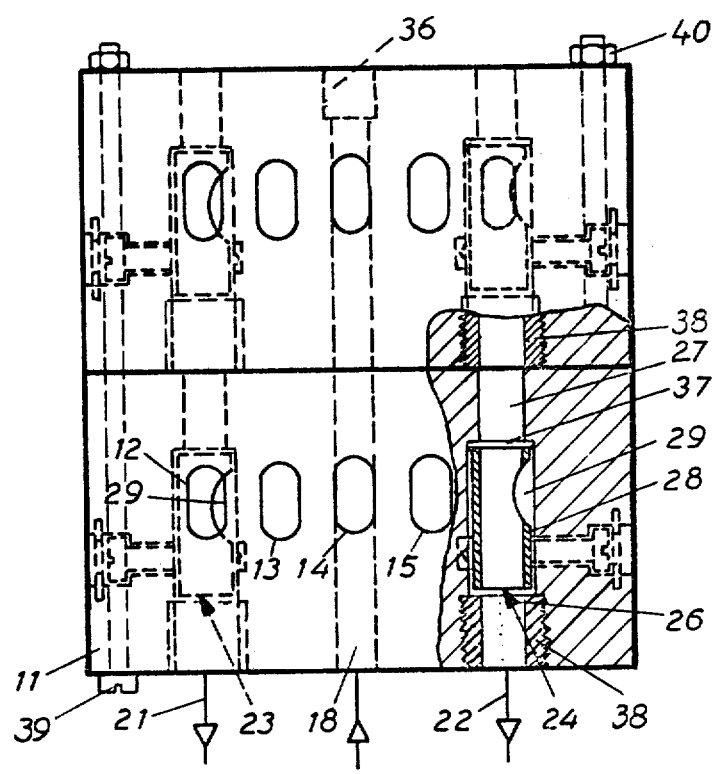
FIG. 4 shows a top view of two identical control valve subplates clamped together in a multiple arrangement. The view is partly broken along line IV—IV in FIG. 3.

In the embodiment shown in FIGS. 3 and 4, the passages in the subplate 11 are located so as to enable a multiple arrangement of control valves. Accordingly, the openings 13 and 15 are extended to the bottom surface of the subplate for communication with the pneumatic motor 17 via service conduits 19, 20.

The pressure air supply passages 18 are extended right through the subplates 11. In the downstream subplate, the supply passage 18 is provided with an end closure plug, schematically illustrated in dotted lines at 36.

The flow restricting valves 23, 24 of the two subplates have common outlets in that the borings 27 have been extended throughout the subplates. The tubular valve bodies 28, which form parts of the outlet passages are axially supported in one direction by shoulders 37 in the borings 27. In the opposite direction, the valve bodies 28 are supported by threaded bushings 38 inserted in the outlet passages 26.

The two subplates are clamped together by two screws 39 provided with nuts 40. Other kinds of clamping means may be used in case more valves are put together in a rack. The subplate design does not limit the number of valves to be put together in a multiple arrangement.

The embodiments of the invention may be freely varied within the scope of the invention as defined by the claims.

What we claim is:

1. An adjustable flow restricting valve comprising:

a housing (11);

a first passage (26,27) extending completely through said housing (11) and comprising a cylindrical bore (27);

a tubular valve body (28) open ended at both ends thereof and rotatably supported in said bore (27) and forming a part of said first passage (26,27), said tubular valve body (28) being formed of a plastic material;

a second passage (25) in said housing (11) extending laterally from said first passage (26,27);

said tubular valve body (28) being cylindrical and having a longitudinal rotation axis about which it is rotatable in said bore (27), said valve body (28) having a lateral opening (29) therein by means of which said valve body (28) in response to its angular position controls communication between said first and second passages (25,26); and a maneuver means (30) movably supported in said housing (11) and contacting said valve body (28) for producing angular displacement of said valve body (28) in said bore of said first passage (26,27) about said longitudinal rotation axis of said valve body (28), said maneuver means (30) including an elongated screw (30) arranged with its longitudinal axis perpendicular to a plane which includes the rotation axis of said valve body (28) and directly contacting said valve body (28) to form a worm gear with said valve body (28), said elongated screw (30) having self-tapping threads thereon which are arranged to cut gear teeth on said plastic tubular valve body (28).

2. Valve according to claim 1, wherein said bore of said first passage (26,27) forms the outlet passage of the valve, and said second passage (25) forms the inlet passage of the valve.

3. Valve according to claim 1, wherein said lateral opening (29) in said tubular valve body (28) extends over a predetermined circumferential side wall portion of said cylindrical tubular valve body (28).

4. Valve according to claim 1, comprising:

a second open ended tubular valve body rotatably supported in said bore (27);

a third passage in said housing and extending laterally from said first said second tubular valve body being cylindrical and having a longitudinal rotation axis about which it is rotatable in said bore of said first passage, said second valve body having a lateral opening therein by means of which said second valve body in response to its angular position controls communication between said first and third passages; and second maneuver means movably supported in said housing and contacting said second valve body for producing angular displacement of said second valve body in said bore of said first passage about said longitudinal rotation axis of said second valve body;

said first and second valve bodies being in flow communication with each other in said first passage.

5. Valve according to claim 4, wherein said housing conprises first and second subplates, said first passage (26,27) extending completely through said first and second subplates, said first tubular valve body and second passage being in said first subplate, and said second tubular valve body and third passage being in said second subplate.

6. Valve according to claim 4, wherein said bore of said first passage (26,27) forms the outlet passage of the valve, and said second and third passages form respective inlet passages of the valve.

7. An adjustable flow restricting valve comprising:

a housing (11) which includes first and second subplates;

a first passage (26,27) extending completely through said first and second subplates of said housing (11) and comprising a cylindrical bore (27);

a first tubular valve body (28) open ended at both ends thereof and rotatably supported in said bore (27) and forming a part of said first passage (26,27), said first tubular valve body being in said first subplate;

a second passage (25) in said first subplate of said housing (11) and extending laterally from said first passage (26,27);

said first tubular valve body (28) being cylindrical and having a longitudinal rotation axis about which it is rotatable in said bore (27), said first valve body (28) having a lateral opening (29) therein by means of which said first valve body (28) in response to its angular position controls communication between said first and second passages (25,26);

a first maneuver means (30) movably supported in said housing (11) and contacting said first valve body (28) for producing angular displacement of said first valve body in said bore of said first passage (26,27) about said longitudinal rotation axis of said first valve body;

a second open ended tubular valve body rotatably supported in said bore (27), said second tubular valve body being in said second subplate;

a third passage in said second subplate of said housing (11) and extending laterally from said first passage (26,27);

said second tubular valve body being cylindrical and having a longitudinal rotation axis about which it is rotatable in said bore of said first passage, said second valve body having a lateral opening therein by means of which said second valve body in response to its angular position controls communication between said first and third passages; and second maneuver means movably supported in said housing and contacting said second valve body for producing angular displacement of said second valve body in said bore of said first passage about said longitudinal rotation axis of said second valve body;

said first and second valve bodies being in flow communication with each other in said first passage.

8. Valve according to claim 7, wherein said bore of said first passage (26,27) forms the outlet passage of the valve, and said second and third passages form respective inlet passages of the valve.

9. Valve according to claim 7, wherein each of said first and second maneuver means comprises an elongated maneuver screw arranged with its longitudinal axis perpendicular to a plane which includes the rotation axis of the respective associated valve body and which directly contacts said respective associated valve body to form a worm gear with its associated valve body.

10. Valve according to claim 7, wherein said first and second tubular valve bodies are formed of plastic material, and wherein said first and second maneuver means each comprise respective screws having self-tapping threads thereon which are arranged to cut gear teeth on the respective associated plastic tubular valve bodies.

11. Valve according to claim 9, wherein said first and second tubular valve bodies are formed of plastic material, and wherein said maneuver screws each have self-tapping threads thereon which are arranged to cut gear teeth on their respective associated plastic tubular valve bodies.

12. An adjustable flow restricting valve comprising:
a housing (11);
a first passage (26,27) extending completely through said housing (11) and comprising a cylindrical bore (27);
a first tubular valve body (28) open ended at both ends thereof and rotatably supported in said bore (27) and forming a part of said first passage (26,27);
a second passage (25) in said housing (11) extending laterally from said first passage (26,27);
said first tubular valve body (28) being cylindrical and having a longitudinal rotation axis about which it is rotatable in said bore (27), said first valve body (28) having a lateral opening (29) therein by means of which said first valve body (28) in response to its angular position controls communication between said first and second passages (25,26);
a first maneuver means (30) movably supported in said housing (11) and contacting said first valve body (28) for producing angular displacement of said first valve body in said bore of said first passage (26,27) about said longitudinal rotation axis of said first valve body, said first maneuver means including a first elongated maneuver screw arranged with its longitudinal axis perpendicular to a plane which includes the rotation axis of said first valve body (28) and which directly contacts said first valve body to form a worm gear with said first valve body;
a second open ended tubular valve body rotatably supported in said bore (27);
a third passage in said housing and extending laterally from said first passage (26,27);
said second tubular valve body being cylindrical and having a longitudinal rotation axis about which it is rotatable in said bore of said first passage, said second valve body having a lateral opening therein by means of which said second valve body in response to its angular position controls communication between said first and third passages; and
second maneuver means movably supported in said housing and contacting said second valve body for producing angular displacement of said second valve body in said bore of said first passage about said longitudinal rotation axis of said second valve body, said second maneuver means including a second elongated maneuver screw arranged with its longitudinal axis perpendicular to a plane which includes the rotation axis of said second valve body and which directly contacts said second valve body to form a worm gear with said second valve body;
said first and second valve bodies being in flow communication with each other in said first passage.

13. Valve according to claim 12, wherein said first and second tubular valve bodies are formed of plastic material, and wherein said first and second elongated maneuver screws each have self-tapping threads thereon which are arranged to cut gear teeth on the respective associated plastic tubular valve bodies.

14. Valve according to claim 11, wherein said bore of said first passage (26,27) forms the outlet passage of the valve, and said second and third passages form respective inlet passages of the valve.

15. An adjustable flow restricting valve comprising:
a housing (11);
a first passage (26,27) extending completely through said housing (11) and comprising a cylindrical bore (27);
a first tubular valve body (28) formed of plastic material, said first tubular valve body (28) being open ended at both ends thereof and rotatably supported in said bore (27) and forming a part of said first passage (26,27);
a second passage (25) in said housing (11) extending laterally from said first passage (26,27);
said first plastic tubular valve body (28) being cylindrical and having a longitudinal rotation axis about which it is rotatable in said bore (27), said first plastic valve body (28) having a lateral opening (29) therein by means of which said first plastic valve body (28) in responsive to its angular position controls communication between said first and second passages (25,26);
a first maneuver means (30) including a first screw having self-tapping threads thereon and which is movably supported in said housing (11) and contacting said first plastic valve body (28) for producing angular displacement of said first valve body in said bore of said first passage (26,27) about said longitudinal rotation axis of said first valve body, said first screw being arranged such that its self-tapping threads cut gear teeth on said first plastic valve body;
a second open ended tubular valve body formed of plastic material and rotatably supported in said bore (27);
a third passage in said housing and extending laterally from said first passage (26,27);
said second plastic tubular valve body being cylindrical and having a longitudinal rotation axis about which it is rotatable in said bore of said first passage, said second plastic valve body having a lateral opening therein by means of which said second plastic valve body in response to its angular position controls communication between said first and third passages; and
second maneuver means including a second screw having self-tapping threads thereon and which is movably supported in said housing and contacting said second plastic valve body for producing angular displacement of said second valve body in said bore of said first passage about said longitudinal rotation axis of said second valve body, said second screw being arranged such that its self-tapping threads cut gear teeth on said second plastic valve body;
said first and second valve bodies being in flow communication with each other in said first passage.

16. Valve according to claim 15, wherein said bore of said first passage (26,27) forms the outlet passage of the valve, and said second and third passages form respective inlet passages of the valve.

* * * * *